United States Patent
Levinson (10) Patent No.: US 7,599,583 B2
(45) Date of Patent: Oct. 6, 2009

(54) SENSORS WITH MODULAR ARCHITECTURE

(75) Inventor: Frank Levinson, Syracuse, IN (US)

(73) Assignee: Finisar Corporation, Sunnyvale, CA (US)

( * ) Notice: Subject to any disclaimer, the term of this patent is extended or adjusted under 35 U.S.C. 154(b) by 437 days.

(21) Appl. No.: 11/278,116

(22) Filed: Mar. 30, 2006

(65) Prior Publication Data

US 2006/0228998 A1 Oct. 12, 2006

Related U.S. Application Data

(60) Provisional application No. 60/666,903, filed on Mar. 31, 2005, provisional application No. 60/666,906, filed on Mar. 31, 2005, provisional application No. 60/666,905, filed on Mar. 31, 2005.

(51) Int. Cl.
*G02B 6/12* (2006.01)
*B24B 49/00* (2006.01)

(52) U.S. Cl. ............... 385/14; 385/12; 385/88; 385/89; 385/92; 451/22

(58) Field of Classification Search ........... 385/14, 385/12, 88, 89, 92, 93, 94, 129, 130, 131, 385/132; 700/52, 53, 65, 66, 12; 451/22; 398/134, 38, 138, 139, 164, 197
See application file for complete search history.

(56) References Cited

U.S. PATENT DOCUMENTS

| | | | |
|---|---|---|---|
| 5,745,030 A * | 4/1998 | Aaron | 340/426.11 |
| 6,271,766 B1 | 8/2001 | Didden et al. | 340/853.1 |
| 6,534,705 B2 | 3/2003 | Berrios et al. | 136/292 |
| 6,791,611 B2 * | 9/2004 | Yang | 348/302 |
| 6,889,165 B2 | 5/2005 | Lind et al. | 702/183 |
| 6,989,589 B2 * | 1/2006 | Hammadou et al. | 257/685 |
| 7,021,132 B2 | 4/2006 | Nigon et al. | 73/146.5 |
| 7,244,500 B2 | 7/2007 | Watts et al. | 428/408 |
| 2003/0033032 A1 * | 2/2003 | Lind et al. | 700/52 |
| 2004/0208600 A1 | 10/2004 | Guenter et al. | 398/135 |
| 2005/0017315 A1 * | 1/2005 | Hammadou et al. | 257/431 |
| 2005/0159661 A1 | 7/2005 | Connelly et al. | 600/410 |
| 2006/0180479 A1 * | 8/2006 | Sparkes et al. | 205/792 |
| 2006/0228998 A1 * | 10/2006 | Levinson | 451/22 |

(Continued)

OTHER PUBLICATIONS

"Photonic Power - Isolated Power Delivery Systems", Photonic Power Products: Photovoltaic Power Converters, Photonic Power Modules, Optically Powered Data Link System. http://www.jdsu.com/index.cfm?pagePath=Products/Photonic_Power JDS Uniphase Corporation, Copyright 2006.

(Continued)

*Primary Examiner*—Brian M Healy
(74) *Attorney, Agent, or Firm*—Workman Nydegger (57) ABSTRACT

A modular sensing system architecture. A sensing system includes multiple planes that are in electrical communication. A power plane provides a power source and a communications module that can be optical and/or electrical in nature. The power source can be upgraded using optical power delivered over an optical fiber. The sensing system can also both transmit/receive data over the optical fiber. A processing plane provides memory and processing power. The processing plane can be updated/upgraded via the communications module or the optical fiber. A sensor plane includes multiple sensors. The architecture enables sensor planes to be interchangeable while still having communication with other planes of the sensor. The processing plane can be updated to accommodate different sensor configurations.

18 Claims, 3 Drawing Sheets

U.S. PATENT DOCUMENTS

2007/0060800 A1  3/2007  Drinan et al. .............. 600/300

OTHER PUBLICATIONS

"Powering Remote Data Links over Fiber", JDSU Uniphase Corporation 2006 http://www.JDSU.com.

"Photonic Power Solutions for Communications Deployments", JDS Uniphase Corporation 2005 http://www.JDSU.com.

"MoteWorks TM" Document Part No. 6030-0001-01 Rev A, Crossbow www.xbow.com.

Crossbow Products: OEM Development Kit; Gateways & Network Interfaces Modules; Processor/Radio Modules; Moteworks Hardware Mote Kits; Sensor/Data Acquisition Modules; Mote Systems; Packaging Solutions; Motes, Smart Dust Sensors, Wireless Sensor Networks. Crossbow Technology, Inc., 2006. http://www.xbow.com/Products/productsdetails/.

"Crossbow Announces Industry First with Open, Integrated Platform to Enable Emerging Wireless Sensor Network Market", San Jose, CA: Dec. 5, 2005. Crossbow Technology, Inc. www.xbow.com.

"Wireless Sensor Network Deployments with Fortune 500 Companies Demonstrate Crossbow's Market Leadership", San Jose, CA: Dec. 5, 2005. Crossbow Technology, Inc. www.xbow.com.

"Industrial Wireless Sensor Networking", Published Jun. 28, 2004, ON World Inc. http://onworld.com/html/industrialwirelesssensor.htm.

"ZigBee Competitive Landscape" Published Apr. 14, 2005. ON World Emerging Wireless Research, ON World, Inc. http://onworld.com/zigbee/.

"Wireless Sensor Networks: Growing Markets, Accelerating Demand", Published Jul. 25, 2005. ON World Emerging Wireless Research, ON World, Inc. http://onworld.com/wsn/wirelesssensors.htm.

"Wireless Sensor Networks Technology Dynamics", Published Jul. 25, 2005, ON World, Inc. http://onworld.com/wsn/wsntechdyn.htm.

"Wireless Sensor Networking for AMR & Submetering", Published Oct. 20, 2004, ON World, Inc. http://onworld.com/html/fwamrsynopsis.htm.

"Wireless Sensor Networks for the Oil & Gas Industry", Published Oct. 11, 2005, ON World, Inc. http://onworld.com/wsn/oil&gas.htm.

Specifications 9XStream (900 MHz), 24XStream (2.4 GHz) MaxStream, Inc., 1998-2003.

Specifications for the 9XCite MaxStream, Inc., 2004.

9XTend 900 MHz OEM RF Module Specifications MaxStream, Inc., 2005.

XBee & XBee-PRO 2.4 GHz OEM RF Modules Specifications MaxStream, Inc., 2005.

* cited by examiner

SENSORS WITH MODULAR ARCHITECTURE

RELATED APPLICATIONS

This application claims the benefit of:

U.S. Provisional Application Ser. No. 60/666,903 filed Mar. 31, 2005 and entitled SYSTEMS AND METHODS FOR COLLECTING DATA WITH SENSORS;

U.S. Provisional Application Ser. No. 60/666,906 filed Mar. 31, 2005 and entitled POWER AND COMMUNICATION INTERFACE FOR SENSORS USING A SINGLE TETHERED FIBER; and U.S. Provisional Patent Application Ser. No. 60/666,905 filed Mar. 31, 2005 and entitled SENSORS WITH MODULAR ARCHITECTURE;

which applications are incorporated herein by reference.

BACKGROUND OF THE INVENTION

1. The Field of the Invention

The present invention relates to the field of sensors and sensing systems. More particularly, embodiments of the invention relate to the field of modular sensing system including sensing systems with interchangeable planes with different sensor configurations.

2. The Relevant Technology

In general, a sensor is a device that generates an output based on some type of input. Sensors have been developed that can respond to a wide range of inputs including, by way of example, nuclear, electromagnetic, chemical, biological, thermal, and mechanical inputs. The ability to respond to many different types of input has made sensors an important aspect of technology. As a result, sensors are increasingly used in a wide range of activities that include, for example, medicinal purposes, environmental purposes, commercial endeavors, industrial activities and biological functions.

In each of these types of activities, there is a growing dependence on the ability to collect, monitor, and analyze data. Sensors help in this endeavor by facilitating and improving the process of collecting and analyzing the data. Sensors improve the ability to collect and analyze data for several reasons. For instance, sensors are usually able to detect a situation more rapidly than a person can detect the same situation. Sensors can also detect subtle changes and detect minute quantities that a person cannot discern. In addition, sensors can be deployed in locations and situations where it is often impractical to deploy people.

The data collected by sensors can be used in various ways. Sensor data can be collected over time to monitor trends or to measure changes over time. For example, traffic patterns are collected with sensors over time before implementing a form of traffic control. Collecting the traffic data over time enables a traffic control system to be more efficient. Sensors can also collect data that can be analyzed and used to make quick decisions. For example, automobiles have multiple sensors that collect information that is used to determine when an air bag should be deployed. Clearly, the air bag should not be deployed unnecessarily but only when an accident occurs. As a result, the data collected by the multiple sensors is analyzed collectively to distinguish, for instance, between a true accident and when someone is simply leaning forward.

While sensors can have a beneficial impact on the ability to collect, monitor, and analyze data, there are some limitations that have not been overcome. Some of these limitations relate, for example, to the ability of a sensor to be adapted to new uses and situations. Conventional sensors have components that cannot be readily substituted with other components. In addition, conventional sensors are not able to adapt to new sensor configurations or provide the support in terms of both hardware and software that may be required for multiple sensor configurations.

More particularly, a conventional sensor architecture developed for a particular sensing purpose, for example, cannot be readily adapted to a different sensing purpose. Systems and methods are needed that enable sensors to be adapted to various situations using multiple sensor configurations.

BRIEF SUMMARY OF THE INVENTION

These and other limitations are overcome by embodiments of the invention which relate to sensing system including a modular sensing system architecture. The modular sensing system architecture includes planes that can be developed and fabricated independently of other planes. This enables planes to be interchanged to provide variable functionality. In addition, the planes may include processing components that can be reprogrammed or updated to perform different or additional tasks. In some embodiments, the power source of the sensing system is rechargeable or can be powered using optical power.

The modular structure of a sensing system therefore provides configurable functionality. In one example of the modular sensing system architecture, a sensing system may include a power plane, a processing plane, and a sensing plane. The power plane includes a power supply, which may be rechargeable. For example, an optical fiber may be connected or tethered with the sensor's power plane, which includes a semiconductor device with multiple photodiodes and/or a laser. The semiconductor device can be grown monolithically. Further, optical alignment issues that limit power in conventional segmented and serially connected photodiodes are eliminated. Light incident on the photodiodes can generate a current that can be used to power the sensor, recharge the battery, or bias a laser which may also be included in the semiconductor device.

The power plane may also include a communication module. The communication module may include the laser, which can be modulated to transmit data over the tethered optical fiber. The communication module may also be an RF module.

The processing plane typically provides the processing power required by the sensing system. The processing plane may include a microprocessor, memory (RAM, FLASH, etc.), Field Programmable Gate Arrays (FPGAs), and the like. The processing plane can be reprogrammed remotely to make the sensing system perform new or additional functionality. The processing plane can be reprogrammed using data transmitted over the tethered optical fiber, for example and/or by receiving RF data remotely.

The sensing plane includes a set of sensors that collect certain data. The modular nature of the sensing system architecture permits different sensor sets to be formulated. The sensing planes can be fabricated with similar or identical interfaces such that the sensing planes can have electrical communication with other planes regardless of the specific sensor set. The processing plane can be programmed to accommodate the various sensor set as well. During fabrication, the appropriate sensor set can be selected and integrated with the modular sensing system.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to sensing system and more particularly to remote sensing systems. Embodiments of the invention include a modular sensing system architecture that includes stackable planes. Each plane can be adapted for specific functionality. As a result, multiple sensor configurations can be selected by swapping out one plane for another. Typically, the sensor configuration is selected during fabrication. Once deployed, the functionality of a sensing system can be changed by swapping out the sensing system.

Once the appropriate set of planes are selected for a given application, the planes are assembled into an integrated unit. This is achieved, for example, by bonding the planes together. When the planes are bonded together or otherwise assembled, the various components in the respective planes become electrically connected. This enables interplane communication and permits data collected from the sensors of the sensing system, for example, to be accessible to other components within the structure of the sensing system.

The architecture of the modular sensing system and the interplane communication also accommodates systems and methods for powering the sensing system or for renewing or recharging a sensing system's power supply. Because the power supply is renewable or rechargeable, the sensing system can both remain in a remote location and also have the ability to transmit/receive data without draining the power supply and consequently shortening the life of the sensing system.

Modular Sensing System Architecture

Figure 1:
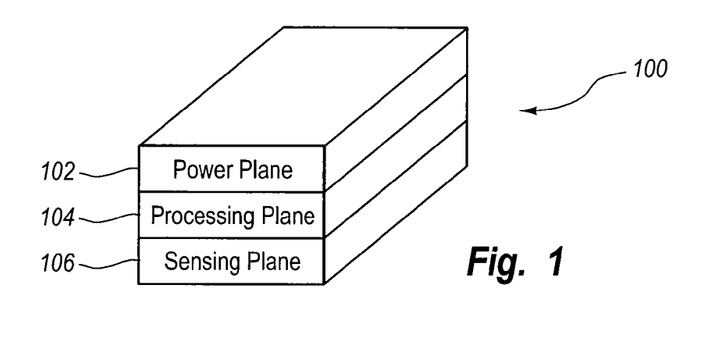
FIG. 1 illustrates one embodiment of a perspective view of a modular sensing system.

FIG. 1 illustrates one embodiment of a sensing system 100. The sensing system 100 is modular and can include multiple planes. The planes of the sensing system 100 are typically independent of each other and can therefore be assembled in different configurations by changing out one plane for another. If one of the planes includes a sensor or a set of sensors, for example, then the capability of the sensing system 100 to collect or monitor data can be changed by simply providing a plane with different sensors. The various planes of the sensing system 100 are stackable and provide interplane communication when assembled together. The interplane communication accommodates different sensor configurations and the like.

Figure 2:
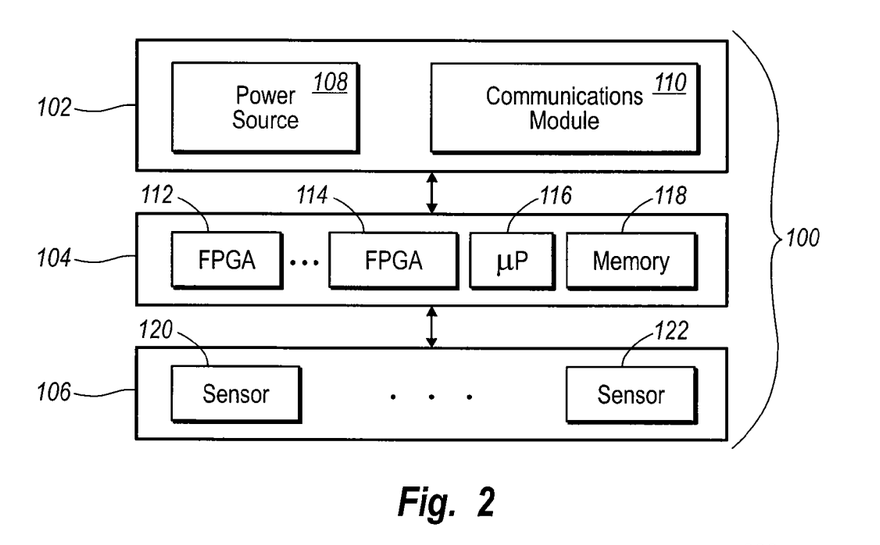
FIG. 2 illustrates examples of planes in a modular sensing system architecture including a power plane, a processing plane, and a sensor plane.

With reference to FIGS. 1 and 2, one embodiment of the sensing system 100 includes a power plane 102, a processing plane 104, and a sensing plane 106. These planes 102, 104, and 106 can be assembled together to form an integrated sensing system 100. The various components within the respective planes can be arranged such that interplane communication is possible even when a new plane is selected for inclusion in a particular sensor. Additional planes can be added to provide additional functionality or for other reasons such as forming a hermetic seal for the sensor's components.

The power plane 102 includes components that provide power to the sensing system 100. The power source 108 provides the power required both the processing plane 104 and the sensing plane 106. The components in power plane 102 may also include a communication module 110 that is powered by the power source 108. In some embodiments, the power source 108 is renewable or rechargeable. A renewable or rechargeable power source 108 enables the communication module 110 to transmit more effectively and with more power because the power source 108 can be recharged. In one example, the sensing system 100 can communicate wirelessly. This facilitates the collection of data in real time. Advantageously, data can be collected remotely without having to physically access the sensor and connect it to another device.

The processing plane 104 may include various combinations of components that are used to process or store the data collected or provided by sensors in the sensing plane 106. In this example, the processing plane 104 includes a microprocessor 116 and associated memory 118. The memory 118 may include volatile (e.g., RAM) and/or nonvolatile memory (e.g., FLASH memory). The nonvolatile memory can be used to store, by way of example, the analyzed or processed sensor data as well as other code executed by microprocessor 116. One of skill in the art can appreciate that the microprocessor 116 may be implemented as another device such as a microcontroller and the like.

The processing plane 104 may also include one or more field programmable gate arrays (FPGAs). The FPGAs can be either digital or analog in nature and can therefore be configured to perform various tasks. The FPGAs can provide, by way of example and not limitation, analog to digital converters, digital to analog converters, timers, counters, amplifiers, filters, pulse width modulators, and the like or any combination thereof. In one embodiment, the processing plane 104 may include a PSoC™ Mixed Signal Array available from Cypress MicroSystems.

Because the sensing system 100 can receive data remotely, the processing plane can be configured or updated remotely. This enables code stored in the processing plane to be updated or altered. In one embodiment, the sensing system can be remotely reprogrammed to perform new or additional functions.

The sensing plane 106 includes one or more sensors that collect data. The data collected by the sensors in the sensing plane 106 can be processed by the processing plane 104 and communicated to a remote location through the communication module 110 provided in the power plane 102. Alternatively, the processed data can be stored in the memory 118 until it is retrieved at a later date either remotely or directly. Sensors that can be included in the sensing plane 106 include, but are not limited to, biological sensors, chemical sensors, physical sensors (temperature, speed, pressure, etc.), electromagnetic sensors, nuclear sensors, and the like or any combination thereof.

Figure 3:
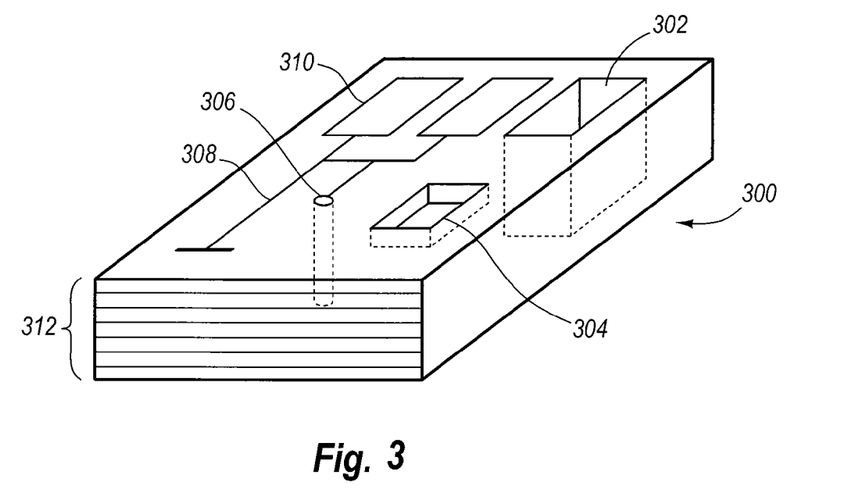
FIG. 3 illustrates one embodiment of a plane that includes multiple layers with cavities for accommodating components that are included in a sensing system.

FIG. 3 illustrates an example of a plane 300 that may be included in the sensing system 100. In one embodiment, the plane 300 may be formed from a ceramic material known in the art as "green clay" and may include multiple layers 312. Conductive paths 308 and other components 310 can be located on each of the layers 312. The plane 300 may also include vias 306 that enable electrical communication between the layers 312 as required.

The plane 300 also includes cavities 302 and 304. The cavity 302 passes completely through the plane 300 while the cavity 304 only partially extends into the plane 300. The cavities 302 and 304 may be used to hold various components that may not be an integral part of a particular layer like the conductive paths. The cavities 302 and 304 can hold more bulky components yet still permit the assembled sensing system to have a compact and common shape and size if desired.

For example in the plane 104 shown in FIGS. 1 and 2, the FPGA 112 and 114, the microprocessor 116, and the memory 118 may each be placed within a cavity such as the cavity 302 or 304. Various types of connections can be used to connect components placed within the various cavities 302, 304 of the plane 300. Also, placing components within the cavities ensures that the layers remain stackable and can be fabricated in a uniform manner even though the various planes include different components including different sensors.

Figure 4:
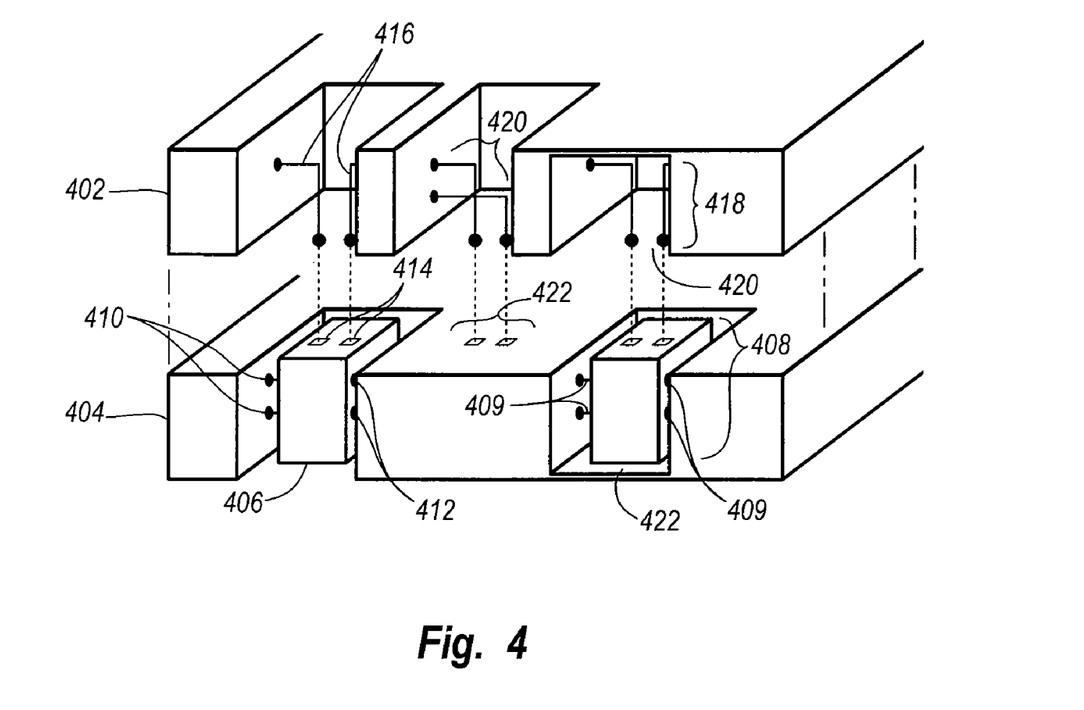
FIG. 4 illustrates one embodiment of electrical connections between planes and an example of a hermetic seal formed by the coupled planes.

FIG. 4 illustrates an example of interplane communication in a sensor. FIG. 4 illustrates a processing plane 402 and a sensing plane 404 before the planes are integrated or bonded together. The sensing plane 404 includes a sensor 406 and a sensor 408 that are each disposed within a corresponding cavity of the sensing plane 404. The sensor 406 is connected to one or more layers of the sensing plane through the connections 410 and 412. The connections 410 and 412 may include, by way of example, I²C, power, and the like. The sensor 408 has similar connections 409.

The processing plane 402 has leads 416 and 418 that are formed within corresponding cavities of plane 402. In this example, the leads 416 are configured to come into contact with the contacts 414 when the processing plane 402 is connected or bonded with the sensing plane 404. In another embodiment, the leads 420 can contact the contacts 422, which may be connected with one of the sensors 406 and or 408 through various layers of the plane 404.

When the sensing system is fabricated, the various planes are positioned such that the leads in one plane match up with the contacts in another plane. Then, the planes are bonded or otherwise connected together to form a sensing system. During fabrication of the sensing system or of a particular plane when one plane is bonded to another plane, each lead may be secured to a corresponding contact by welding or soldering to ensure a proper electrical contact. Each plane may have an insulation layer to ensure that interplane communication occurs only where specified. The planes can be sealed together to ensure that leads and contacts in respective planes are in adequate contact. Advantageously, some of the components that are placed within cavities of the planes are hermetically sealed. FIG. 4, for example, illustrates that the cavity 420 and the cavity 422 are partial cavities and that the sensor 408 can be hermetically sealed inside the sensor when the planes 402 and 404 are bonded together.

Sensing System Power Source

Some sensing systems typically require a power source such as a battery. The battery, as previously described, has a limited life. Embodiments of the invention, however, deliver optical power to the sensing systems that can be converted to an electrical form. The optical power can also be modulated such that both data and power can be delivered to a sensing system on the same optical signal. The sensing system can also transmit data, in full duplex, over the same optical fiber.

Figure 5:
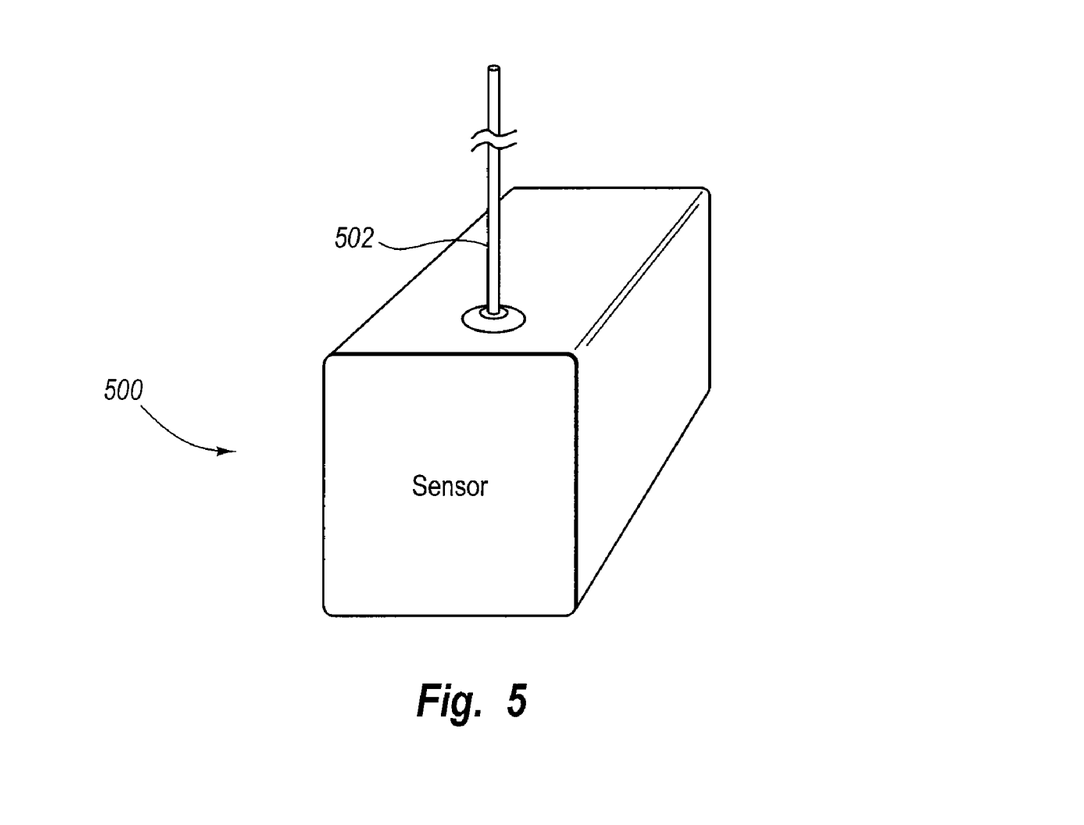
FIG. 5 illustrates one embodiment of a sensing system with a tethered optical fiber.

In one embodiment, an optical fiber is used to deliver the optical power to a sensing system and FIG. 5 illustrates an example of a sensor tethered to an optical fiber. The sensing system 500 is tethered or coupled with a cable that is an optical fiber 502 in this example. Through the optical fiber 502, optical power can be delivered to the sensing system. The tether enables the sensing system 500 to be placed in a remote location. A person can then interface with the sensing system 500 through the other end of the optical fiber that is typically placed in a more convenient location than the sensing system itself.

The optical power can be converted to electrical power to trickle charge a power source such as a battery, for example. The ability to optically recharge a battery enables the sensing system to transmit and receive data without fear of shortening the life of the sensing system as is the case in conventional sensing systems that only have a limited battery life. The signal used to deliver optical power to the sensor can also be modulated and thus carry data to the sensor to reprogram or upgrade the capabilities of the sensing system.

The optical fiber 502 further enables the sensing system to be placed in locations where an electrical cable is unsuitable, such as in refineries, petrochemical towers or other places where potential sparks are unwanted. In fact, a tethered sensor can be used in a variety of environments including, by way of example and not limitation, ocean floors, oil and gas fields, geographic structures such as volcanoes, animal habitats, ecosystems and the like. The sensing system 500, once placed in an environment, can then be accessed through the optical fiber 502 without having to disturb the environment.

Figure 6:
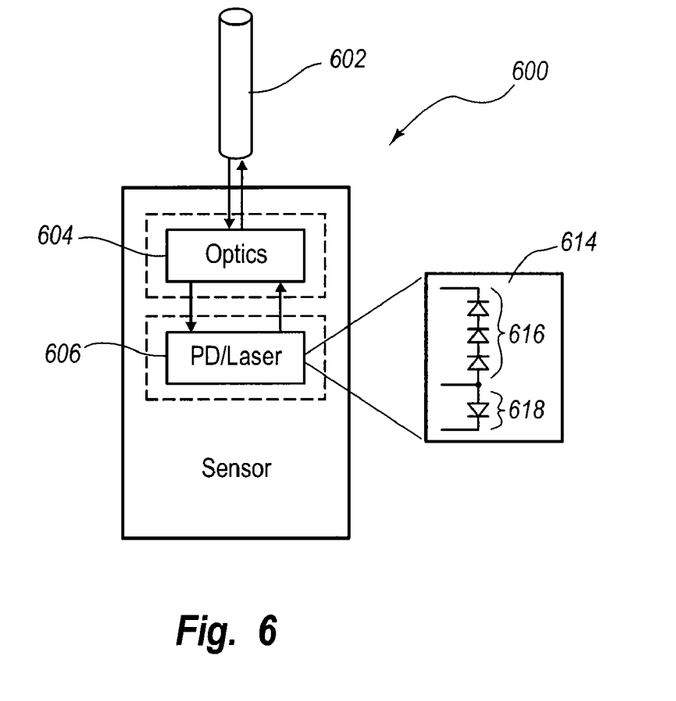
FIG. 6 illustrates one embodiment of a more detailed view of an optical fiber tethered to a sensing system such that optical power can be delivered to the sensing system.

FIG. 6 illustrates another example of a sensing system tethered to an optical fiber. The sensing system 600 includes an optical device 606 that includes both a photodiode and a laser. In this example, the optical device 606 is an integrated semiconductor device that is grown in series. The box 614 illustrates that the optical device 606 includes, in this example, a series of photodiodes 616 and a semiconductor laser 618 grown monolithically. The optical device 606 may also include a transistor that can be turned on/off to control when the laser is active. The transistor may also control the ability to direct the current in the photodiodes to the battery, to the laser, or to other portions of the sensor. This may increase the amount of current available for charging the power supply or for other purposes of the sensor.

In this example, the photodiodes 616 are not biased and the fiber 602 is configured to emit light that is incident on the photodiodes 616. The incident light, under the photovoltaic effect, generates current in the photodiodes 616 that can be used, for example, to charge a battery in the sensing system. The voltage generated across the photodiodes by the incident light from the optical fiber 602 may also be used to bias the laser 618, which can be either an edge emitting laser or a vertical cavity surface emitting laser. The laser 618 can be used to transmit data back through the fiber 602. The device 606 therefore enables communication to and from the sensing system 600 through a single optical fiber.

The materials selected to fabricate the optical device 606 may be selected based on the associated wavelengths. For example, the photodiodes may be optimized to detect wavelengths on the order of 850 or 980 nanometers. The laser may use a material system optimized to emit light on the order of 1310 or 1550 nanometers. The material system for both the photodiodes and the laser may be the same. Material systems for 850 or 980 nanometers include GaAs and material systems for 1310 or 1550 nanometers include AlGaAs or InGaAsP. The specific material system selected for the photodiodes and the laser may depend, for example, on the length of the optical fiber. One of skill in the art can appreciate that other semiconductor material systems or semiconductor combinations may be selected to fabricate the optical device 606. One embodiment of the optical device 606 is further described in U.S. Publication No. US 2004/0208600 A1 and in U.S. Publication No. US 2003/0223756 A1, which are both hereby incorporated by reference.

Thus, the fiber 602 is a single fiber that can be used to optically provide power to the sensor 600, deliver data to the sensor 600, and receive data from the sensor 600. Through the fiber 602, the sensing system 600 can receive data needed to upgrade or reprogram the sensor. The ability to reprogram or upgrade the sensing system can further be achieved using code stored in the memory of the sensor.

The optics 604 are configured to direct light emitted from the fiber 602 to the photodiode portion of the device 606 and to direct light emitted by the laser portion of the device 606 back into the laser. As previously stated, the optical power delivered to the sensor over the fiber 602 can also be modulated to carry data to the sensing system. Changes in the photovoltaic effect can be used to detect the data being delivered to the sensing system. In yet another embodiment, the optics 604 may direct the incident light to a transimpedance amplifier used to convert the input optical signal into an electrical signal.

For transmission purposes, the laser light can be modulated by the sensing system itself to send data back through the fiber 602. In some embodiments, the battery power of the sensing system may be used to assist in the reception and transmission of data. The photodiodes, however, can be used to charge the battery at other times when not receiving data to ensure that the sensing system has sufficient power, for example, to collect, receive, transmit, and analyze data.

The device 606 as well as the optics 604 can be integrated with the sensing system, for example, by being incorporated into the power plane. Connections to other planes in the sensing system are achieved as previously described.

Figure 7:
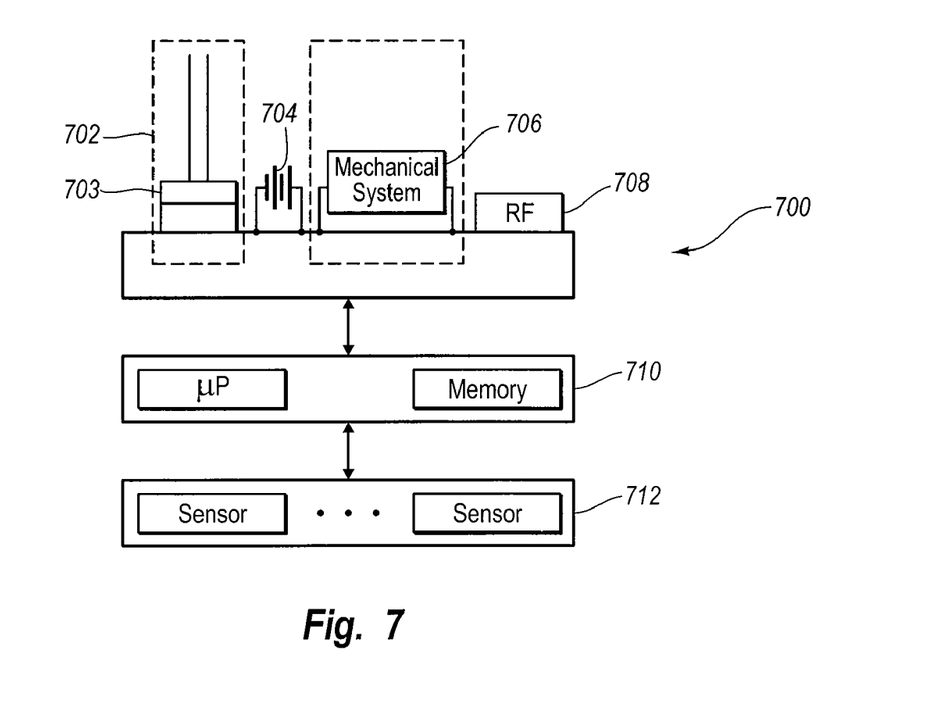
FIG. 7 illustrates multiple examples of components used to provide or recharge power to enable the transmission and reception of data in a sensing system.

FIG. 7 illustrates another embodiment of a sensing system 700 and illustrates additional or alternative power sources. The sensing system 700 includes a tethered fiber 702 that can be used as described previously to communicate with the sensing system 700 as well as provide power for the sensing system 700. The fiber 702, through the photodiodes and laser 703, can charge the battery 704.

The sensing system 700 may also have a mechanical system 706 in addition to or in place of the tethered fiber 702. The mechanical system 706 can be adapted to charge the battery 704. The mechanical system 706 may store energy as the sensing system 700 moves (when connected to a moving object such as an animal or bird) and then discharge the stored energy into the battery when a threshold is achieved. Also, the sensing system 700 may include an RF module 708 for receiving/transmitting data rather than receiving/transmitting data through the fiber 702.

The sensing system described can be made in small sizes. In one embodiment, the sensing system may have a size of less than 1 cm$^3$, although the sensing system can also be smaller or larger. The size of the sensing system may depend on the environment in which the sensing system is deployed as well as the type of sensors in the sensing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sensing system comprising:
    a power plane that includes a power source and a communications module, the power plane further comprising:
    semiconductor device that includes a plurality of photodiodes and a laser; and
    an optical input configured to connect with an optical fiber, wherein light received over the optical fiber generates a current in the plurality of photodiodes that perform at least one of:
        power the processor and memory in the processing plane;
        recharge the battery; and
        power the one or more sensors;
    a processing plane including a processor and memory;
    a sensing plane that includes one or more sensors, the sensing plane in electrical communication with at least one of the processing plane and the power plane; and
    wherein each of the power plane, processing plane, and sensing plane has at least one surface configured to bond with a corresponding surface on one of the other planes to enable interplane communication.

2. A sensing system as defined in claim 1, the one or more sensors further comprising one or more of a nuclear sensor, an electromagnetic sensor, a chemical sensor, a biological sensor, a thermal sensor, a pressure sensor, and a programmable sensor.

3. A sensing system as defined in claim 1, wherein the processing plane further comprises a plurality of field programmable gate arrays.

4. A sensing system as defined in claim 3, the communications module further comprising an RF module, wherein the sensor receives and transmits data using at least one of the RF module and the laser, wherein an output of the laser is modulated and launched in the optical fiber.

5. A sensing system as defined in claim 1, wherein:
    the power plane comprises one or more cavities formed to accommodate the power source and the communications module;
    the processing plane comprises one or more cavities formed therein to accommodate the processor and the memory; and
    the sensor plane comprises one or more cavities formed to accommodate the one or more sensors.

6. A sensing system as defined in claim 5, wherein some of the one or more cavities in the power plane, the processing plane, and the sensing plane form hermetic cavities when the power plane, the processing plane, and the sensing plane are bonded together.

7. A sensing system as defined in claim 6, wherein leads extend into some of the one or more cavities in the power plane, the processing plane, and the sensing plane, wherein the leads are configured to connect with contacts formed on one of the power plane, the processing plane, and the sensing plane.

8. A sensing system as defined in claim 7, wherein a volume of the sensor is less than 1 cubic centimeter.

9. A sensing system as defined in claim 1, wherein the interplane communication includes at least one of electrical communication and optical communication.

10. A modular sensing system comprising:
- a plurality of planes, each plane comprising one or more cavities formed to accommodate components of the sensor such that each plane retains a shape that permits the plurality of planes to be stacked together in a manner that enables interplane communication between the components of the sensor, the interplane communication including electrical communication;
- a power source disposed in a first cavity of a first plane and a communication module disposed in a second cavity of the first plane, wherein the communication module generates a current in response to an optical signal that can recharge the power source;
- one or more sensors disposed in corresponding cavities formed in a second plane; and
- a processor module disposed in a cavity on a third plane, wherein the processor module receives data collected by the one or more sensors and the collected data is transmitted to a remote location using the communication module, wherein the plurality of planes have a volume that is less than 1 cm$^3$.

11. A modular sensing system as defined in claim 10, wherein at least some of the one or more cavities of the plurality of planes form a hermetic cavity that is shared between one or more planes.

12. A modular sensing system as defined in claim 10, wherein the second plane is configured to be replaced with a third plane having a second set of sensors, wherein the processor module is reprogrammed using the communication module to enable operation of the second set of sensors.

13. A modular sensing system as defined in claim 10, wherein the communication module further comprises a plurality of photodiodes and a laser grown in series, the plurality of photodiodes generating the current in response to the optical signal.

14. A modular sensing system as defined in claim 13, the communication module further comprising an optical input that can removably connect with an optical fiber to receive the optical signal to generate the current with the plurality of photodiodes, wherein the optical signal is modulated with data used to reprogram the processor module.

15. A modular sensing system as defined in claim 14, wherein the processor module comprises:
- a processor;
- memory including both volatile memory and non-volatile memory; and
- one or more field programmable gate arrays, each field programmable gate array including one or more of analog to digital converters, digital to analog converters, timers, counters, amplifiers, filters, and pulse width modulators.

16. A modular sensing system as defined in claim 10, wherein the shape of each plane includes a surface that is substantially flat and that is configured to bond with a corresponding flat surface of another plane.

17. A modular sensing system comprising:
- a plurality of planes, each plane comprising one or more cavities formed to accommodate components of the sensor such that each plane retains a shape that permits the plurality of planes to be stacked together in a manner that enables interplane communication between the components of the sensor, the interplane communication including electrical communication;
- a power source disposed in a first cavity of a first plane and a communication module disposed in a second cavity of the first plane, wherein the communication module generates a current in response to an optical signal that can recharge the power source;
- one or more sensors disposed in corresponding cavities formed in a second plane; and
- a processor module disposed in a cavity on a third plane, wherein the processor module receives data collected by the one or more sensors and the collected data is transmitted to a remote location using the communication module, wherein each of the plurality of planes is formed from a ceramic material.

18. A modular sensing system as defined in claim 10, wherein each of the plurality of planes includes one or more layers with conductive traces formed thereon, wherein some of the one or more cavities contain leads that are configured to connect with contacts formed on an adjacent plane.

* * * * *

UNITED STATES PATENT AND TRADEMARK OFFICE
CERTIFICATE OF CORRECTION

PATENT NO. : 7,599,583 B2      Page 1 of 1
APPLICATION NO. : 11/278116
DATED : October 6, 2009
INVENTOR(S) : Frank Levinson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,599,583 B2  Page 1 of 1
APPLICATION NO. : 11/278116
DATED : October 6, 2009
INVENTOR(S) : Levinson It is certified that error appears in the above-identified patent and that said Letters Patent is hereby corrected as shown below:

Column 2
Line 15, change "sensing system" to --sensing systems--

Column 3
Line 35, change "system" to --systems--

Column 4
Line 22, change "both" to --by both--

Column 5
Line 65, change "cavity 420 and the cavity 422 are" to --leads 420 and contacts 422 define--

Signed and Sealed this

Sixteenth Day of November, 2010

David J. Kappos
*Director of the United States Patent and Trademark Office*